United States Patent [19]

Stutz et al.

[11] 4,195,149
[45] Mar. 25, 1980

[54] HARD, RIGID, NON-ELASTOMERIC POLYURETHANE, COMPOSITIONS

[75] Inventors: Herbert Stutz, Karlsruhe; Robert Gehm, Limburgerhof, both of Fed. Rep. of Germany

[73] Assignee: BASF Aktiengesellschaft, Fed. Rep. of Germany

[21] Appl. No.: 818,521

[22] Filed: Jul. 25, 1977

[30] Foreign Application Priority Data

Aug. 28, 1976 [DE] Fed. Rep. of Germany ....... 2638859

[51] Int. Cl.$^2$ ............................................. C08G 18/30
[52] U.S. Cl. ........................................................ 528/49
[58] Field of Search .................. 260/77.5 MA; 528/49

[56] References Cited

U.S. PATENT DOCUMENTS

| | | | |
|---|---|---|---|
| 3,350,361 | 10/1967 | Chandley et al. | 260/77.5 MA |
| 3,726,827 | 4/1973 | Jones et al. | 260/77.5 AB |
| 3,925,582 | 12/1975 | Sample Jr. et al. | 260/77.5 MA |

*Primary Examiner*—Maurice J. Welsh
*Attorney, Agent, or Firm*—Keil & Witherspoon

[57] ABSTRACT

Hard, rigid, non-elastomeric, non-cellular polyurethane compositions manufactured by reacting a liquid hydroxylic polyether having an OH equivalent weight of from 50 to 250, a monofunctional hydroxylic polyether having a molecular weight of from 150 to 10,000 and devoid of further functional groups which react with isocyanates, and an organic polyisocyanate, with or without catalysts, auxiliaries and additives.

2 Claims, No Drawings

HARD, RIGID, NON-ELASTOMERIC POLYURETHANE, COMPOSITIONS

The present invention relates to hard, rigid, non-elastomeric polyurethane compositions which can be cured thermally or by adding suitable catalysts, and to processes for their manufacture.

Polyurethane casting resins and compositions which can be cured thermally or by adding suitable catalysts have already been disclosed and are described in a large number of publications. For example, in High Polymers, J. H. Saunders and K. C. Frisch, Chemistry and Technology of Polyurethanes, Part II, pages 758 et seq. (Interscience Publishers, 1964) give a review of the heat-curable casting resins of the prior art.

However, the manufacture of fairly large, thick-walled moldings presents difficulties, especially if, in order to achieve shorter cycle times, substantial amounts of catalyst have to be employed, as the large amount of heat generated inside the moldings can cause overheating, which may lead to thermal degradation and hence to unsatisfactory mechanical properties of the cured material. Furthermore cracks are frequently encountered, especially in the interior of large and thick-walled articles.

U.S. Pat. No. 3,726,827 and German Laid-Open Application DOS No. 2,258,912 disclose processes which seek to avoid the above disadvantages. The former deals with the manufacture of rapid-setting polyurethane compositions comprising a polyether, a polyisocyanate and appropriate amounts of a suitable catalyst, to which compositions up to 50% of a liquid carboxylic acid ester having a boiling point above 150° C., eg. dioctyl phthalate, are added. DOS No. 2,258,912 further discloses a process for the manufacture of appropriate polyurethane compositions in which a difunctional hydroxy compound having a molecular weight of below 500, a polyisocyanate having an NCO functionality of at least 2.5 and a liquid modifier having a boiling point of at least 150° C. and intended to moderate the evolution of heat during the curing reaction whilst itself virtually not reacting with the polyisocyanate, are subjected to reaction.

It is true that the use of inert liquids to moderate the evolution of heat constitutes an improvement over the prior art since it permits the manufacture of thick-walled articles without thermal degradation in the interior of the article, due to an excessive temperature rise, but the process also suffers from severe disadvantages.

Since the liquid modifier is incompatible with the cured product, the compositions must be cured very rapidly so that the liquid modifier separates out in a very finely divided form and there are no substantial zones of phase separation, which would impair the mechanical properties. Due to this very rapid curing, such compositions can only be processed on machinery; equipment specifically developed for, and suited to, such compositions is required for the purpose, since the rapid reaction would quickly clog and block the mixing heads of conventional equipment.

The presence of a liquid inert phase in the cured material presents the additional hazard that on contact with organic solvents the liquid modifier will be extracted from the material and contaminate the solvent.

It is an object of the present invention to provide hard and rigid, non-elastomeric polyurethane compositions which do no suffer from the above disadvantages and in addition possess better processability.

For the purpose of the invention, the term "hard and rigid, non-elastomeric polyurethane compositions" means compact, non-cellular polyurethane compositions having a density greater than 1 g/cm$^3$, preferably from 1 to 2 g/cm$^3$, which compositions have an elongation at break of less than 100%, preferably of from 1 to 70%, at room temperature.

We have found that such polyurethane compositions are obtained if they are manufactured from a hydroxylic polyether mixture which in addition to conventional polyetherols contains monofunctional, hydroxylic polyethers of fairly high molecular weight, which possess only one hydroxyl group per molecule and are devoid of other functional groups which react with isocyanate.

Accordingly, the present invention relates to hard, rigid non-elastomeric polyurethane compositions which are obtained by reacting A. a liquid, hydroxylic polyether having a functionality of from 2 to 8 and an OH equivalent weight of from 50 to 250, or a mixture of such polyethers, B. a monofunctional, hydroxylic polyether having a molecular weight of from 150 to 10,000.

C. a polyisocyanate or a prepolymer, containing NCO groups, of a polyisocyanate and the hydroxylic polyethers described under A and B and D. if appropriate, catalysts and conventional auxiliaries and additives.

The invention further relates to a process for the manufacture of hard, rigid, non-elastomeric polyurethane compositions, in which the above reactants A, B and C, with or without D, are mixed, poured into molds and allowed to cure.

To manufacture the polyurethane compositions of the invention, the ratios of the amounts of reactants A, B and C are so chosen that the ratio of the NCO groups of C to the sum of the OH groups of A and B is from 0.8:1 to 1.5:1, preferably from 0.9:1 to 1.2:1.

B may be used in amounts of from 5 to 50% by weight, preferably from 5 to 30% by weight, based on the total weight of A, B and C, provided that it is only used in such amounts that the average functionality of the total reaction mixture is in no case less than 2.0, but is preferably from 2.2 to 3, in order to ensure adequate crosslinking of the molding compositions.

Suitable liquid hydroxylic polyethers having a functionality of from 2 to 8, preferably from 2 to 3, and an OH equivalent weight of from 50 to 250, preferably from 80 to 200, which may be used as A, may be manufactured by reacting one or more alkylene oxides, where alkylene is of 2 to 4 carbon atoms, with a starter molecule which contains a plurality of active hydrogen atoms. Examples of such alkylene oxides are ethylene oxide, 1,2-propylene oxide, epichlorohydrin, 1,2- and 2,3-butylene oxide and styrene oxide, amongst which 1,2-propylene oxide and mixtures of 1,2-propylene oxide and ethylene oxide are preferred, the content of 1,2-propylene oxide being at least 65% by weight, preferably at least 75% by weight, based on the total weight of the mixture. The alkylene oxides may be used separately, alternately or as mixtures. Examples of suitable starter molecules are water and organic compounds which contain from 2 to 8, preferably from 2 to 3, hydroxyl groups per molecule. Specific examples are aliphatic diols, eg. butanediol, hexanediol, neopentyl glycol, cyclohexanediol and preferably ethylene glycol and propylene glycol, aromatic dihydroxy compounds, eg. hydroquinone, resorcinol and 4,4'-2,2-dihydroxydiphenylpropane (bisphenol A), glycerol, trimethylolethane, trimethylolpropane, pentaerythritol, sorbitol and sucrose. Mixtures of the above hydroxylic compounds may also be used as starter molecules. Further, it is possible to use polyethers obtained from tetrahydrofuran or from mixtures of tetrahydrofuran and the said alkylene oxides. The use of hydroxylic poly(propylene oxide) and propylene oxide/ethylene oxide copolymers, especially those obtained with glycerol as the starter molecule, is preferred.

The OH equivalent weight of the hydroxylic polyethers used as A should not exceed a value of about 250, since the polyurethanes otherwise become too soft and elastic and exhibit unsatisfactorily low heat distortion points.

Monofunctional, hydroxylic polyethers with molecular weights of from about 150 to about 10,000, preferably from 300 to 5,000, which possess only one hydroxyl group per molecule and no other functional groups which react with isocyanate, and which may be used as B, are the adducts of the above alkylene oxides with monofunctional starter molecules. Specific examples of starter molecules are low molecular weight monofunctional aliphatic alcohols in which alkyl is of 1 to 18 carbon atoms, preferably of 1 to 6 carbon atoms, eg. methanol, ethanol, propanol, butanol, hexanol, decanol, lauryl alcohol, neopentyl alcohol, ethylhexanol, cyclohexanol, tert.-butylcyclohexanol, phenylethanol, allyl alcohol and methylbutenol, aromatic monohydroxy compounds of 6 to 24 carbon atoms, for example phenol, naphthol and alkylated phenols, eg. cresol, trimethylphenol, nonylphenol, dodecylphenol and the like, and organic monocarboxylic acids of 1 to 18 carbon atoms, eg. acetic acid, propionic acid, butyric acid, ethylhexanoic acid, acrylic acid and similar compounds. Here again the starter compounds may be employed individually or as mixtures, and equally the alkylene oxides may be used, in the polymerization, separately, alternately or as mixtures. The polymerization of the alkylene oxides by means of the starter molecules is carried out under conventional reaction conditions, in the presence or absence of conventional catalysts. Polyethers obtained from tetrahydrofuran or from mixtures of tetrahydrofuran with the said alkylene oxides may also be used.

The use of monohydroxypropylene oxide/ethylene oxide copolymers and especially monohydroxypoly(propylene oxides) is preferred.

As already explained, the monofunctional hydroxylic polyethers have molecular weights of from about 150 to about 10,000. However, it is also possible to use low molecular weight monohydroxy compounds, with molecular weights of less than 150. However, with these it is generally a disadvantage that because of their low boiling point and high vapor pressure inhomogeneous and blistered polyurethane articles or molding compositions are frequently formed.

Examples of polyisocyanates which may be used as reactant C for the polyurethane articles and molding compositions of the invention are aliphatic, cycloaliphatic and, preferably, aromatic diisocyanates and/or polyisocyanates. More specifically, these are aliphatic and cycloaliphatic diisocyanates, eg. hexamethylene diisocyanate, trimethylhexamethylene diisocyanate, isophorone diisocyanate, cyclohexane diisocyanate, methylcyclohexane diisocyanate and 4,4'-diisocyanatodicyclohexylmethane, and preferably aromatic diisocyanates and polyisocyanates, eg. xylylene diisocyanate, phenylene diisocyanate, 3,3'-dimethyl-4,4'-diisocyanato-diphenylmethane and 1,5- and 1,8-naphthalene diisocyanate. However, 2,4- and 2,6-toluylene diisocyanate and their technical mixtures, 2,2'-, 2,4'- and 4,4'-diphenylmethane-diisocyanate and their mixtures, and mixtures of diisocyanato-diphenylmethanes and polyphenyl-polymethylene-polyisocyanates (crude MDI) are used especially. The said diisocyanates and polyisocyanates may be used in the pure form or as crude undistilled mixtures, and as individual compounds or mixtures of compounds.

Further suitable polyisocyanates are modified polyisocyanates which contain isocyanurate, biuret, urea, urethane or allophanate groups and which may be obtained in accordance with the prior art by reacting diisocyanates and/or polyisocyanates with suitable modifiers, or example diols, diamines and/or dicarboxylic acids, or by polymerizing polyisocyanates and, above all, prepolymers with terminal isocyanate groups obtained from the above diisocyanates and/or polyisocyanates and the polyethers employed as components A and B.

Advantageously, modified polyisocyanates which contain from 20 to 42% by weight of terminal NCO groups are employed.

It is frequently expedient to add to the mixture catalysts which accelerate the cure. All conventional known catalysts may be used for this purpose, for example tertiary amines or metal compounds, eg. dimethylaminomethylcyclohexane, endoethylenepiperazine and organo-metallic compounds, eg. tin-II octoate, dibutyl-tin dilaurate, lead octoate, lead naphthenate, cobalt naphthenate, zinc naphthenate, iron acetylacetonate and similar compounds which can accelerate the reaction between isocyanate groups and hydroxyl groups.

The catalysts are usually employed in amounts of from 0.001 to 5% by weight, preferably from 0.01 to 1% by weight, based on the sum of the weights of A, B and C. The amount of catalyst generally depends on the nature of the catalyst, the reactivity of the isocyanate groups and the method of processing. In the case of highly active metal catalysts and aromatic diisocyanates, amounts of catalyst of from 0.1 to 2% by weight generally suffice to achieve very rapid cure. For manual processing, however, the pot life can be extended by using substantially smaller amounts of catalyst or dispensing entirely with the catalyst. Curing is in that case carried out thermally by heating at elevated temperatures, eg. at from 50° to 130° C.

If desired, conventional auxiliaries and additives may also be added to the reaction mixture, eg. emulsifiers which improve the miscibility of the starting materials and suppress the phase separation phenomena which to some extent occur on mixing hydroxylic polyethers with polyisocyanates, as well as flameproofing agents, dyes, pigments, organic or inorganic fillers, eg. chalk, kaolin, talc, asbestos, quartz, glass beads, chopped glass fibers, aluminum powder, wood flour or the like, dryers, and additives to protect against aging, light or hydrolysis. The amounts which may be added depend on the nature of the additives and on the envisaged application of the cured compositions and fall within the conventional range known from the prior art and usually employed for the particular category of substances.

Processing is effected by simply bringing the individual reactants together, and mixing them, at from 20° to 100° C., preferably from 20° to 50° C., and it is frequently advisable to free the reactants, before processing, from residual water and from dissolved air by subjecting them to reduced pressure, since blistered products can otherwise easily result. The two hydroxylic polyether reactants A and B are usually combined to form a mixture to which further additives may or may not be admixed. The catalyst for accelerating the cure can, as desired, be added to one of the reactants A, B or C before these are mixed, but is preferably added to the polyether mixture of A and B, though it can also be added after mixing the hydroxylic polyether mixture with the polyisocyanate or with the prepolymer possessing terminal NCO groups.

After mixing and homogenizing, the final reaction mixture can, if desired, be poured into heated molds and be cured. Curing may be carried out under pressure, but is preferably carried out under atmospheric pressure only; it can be effected thermally by heating for several hours, eg. for from 1 to 5 hours, at about 100° C., preferably at from 50° to 130° C. Curing can also be effected without an external source of heat, solely by means of the heat of reaction liberated in the curing reaction. In that case it is advisable to accelerate the cure by adding catalysts.

Depending on the isocyanate component and the choice of the catalyst, the pot life of the compositions, up to when they gel, can be varied over an exceptionally wide range of from several hours to a few seconds, preferably from one hour to 20 seconds. The finished castings can in general—especially in the case of highly reactive formulations—be taken from the mold within 10 minutes and frequently within from one to two minutes. The castings can then be subjected to a thermal after-treatment, if necessary, in order to improve certain properties, for example raise the heat distortion point.

In many cases, however, the moldings are, immediately after having been released from the mold an having cooled, already sufficiently strong to allow them to be used, without further after-treatment, for the envisaged purposes.

The molds for the manufacture of the castings may consist either of metals or of polymers, wood or similar materials. Preferably, molds of low heat capacity or low heat conductivity, eg. thin-walled metal molds or molds made from plastics, are used, or preheated molds at from about 50° to 100° C. are employed.

The compositions according to the invention may be used for a large number of applications, eg. for the manufacture of machinery components, housings, load-bearing elements, furniture components, decorative components or the like.

The Examples which follow illustrate the invention.

EXAMPLE 1

180 g of a commercial polypropylene ether-triol obtained from glycerol and propylene oxide and having an OH number of 400 are mixed with 20 g of a monofunctional polyether obtained from butanol and propylene oxide and having a molecular weight of about 1,600, and the mixture is freed from dissolved gases and residual moisture by stirring at 100° C. and 15 mm Hg. The mixture is then cooled to room temperature and 176 g of a crude mixture of diphenylmethane diisocyanate and polyphenyl-polymethylene polyisocyanate (crude MDI) having a viscosity of 100 cp are added. The mixture is again degassed briefly, stirred for 5 minutes, then poured into heated metal molds and cured for 5 hours at 100° C.

Brown, transparent and very tough sheets are obtained, which, according to the methods of DIN 53,453 have, at room temperature, an impact strength of 60 KJ/m$^2$ and a flexural strength (DIN 53,452) of 96 N/mm$^2$.

EXAMPLE 2

If the procedure described in Example 1 is followed but 160 g of the polypropylene ether-triol having an OH number of 400, 40 g of the monofunctional polyether having a molecular weight of about 1,600 and 158.5 g of crude MDI are used, a polyurethane having an impact strength, at room temperature, of 56 KJ/m$^2$ and a flexural strength of 82 N/mm$^2$ are obtained.

EXAMPLE 3

25 g of a monofunctional ethylene oxide/propylene oxide block copolyether, obtained using allyl alcohol as a starter and containing 33% of ethylene oxide and having a molecular weight of about 900, the material having been obtained by first polymerizing the propylene oxide and then the ethylene oxide onto the starter, are mixed with 210 g of the polypropylene ether-triol described above and the mixture is degassed for 1 hour at 100° C. and 20 mm Hg. 205 g of crude MDI having a viscosity of 100 cp are added to the mixture at room temperature and the batch is stirred for 5 minutes under reduced pressure. The mixture is then poured into preheated molds and cured for 5 hours at 100° C.

Brown, transparent sheets are obtained, which, according to the methods of DIN 53,455, have a tensile strength of 54 N/mm$^2$ and an elongation at break of 4.6%. The flexural strength is 106 N/mm$^2$ and the impact strength is 47 KJ/m$^2$ at room temperature and 19 KJ/m$^2$ at −40° C.

EXAMPLE 4

If the procedure described in Example 3 is followed, but 0.3 ml of dibutyl-tin dilaurate is also added to the reaction mixture before the latter is poured into molds, and the final cure is carried out for only one hour at 100° C., a polyurethane having the following mechanical properties is obtained:
tensile strength: 60 N/mm$^2$;
elongation at break: 5.4%;
flexural strength: 104 N/mm$^2$;
impact strength:
  23° C.: 39 KJ/m$^2$;
  −40° C.: 32 KJ/m$^2$.

EXAMPLE 5

105 g of the polypropylene ether-triol described in Example 1 are mixed with 100 g of a commercial polypropylene ether-diol having a molecular weight of about 430 and 105 g of a polypropylene ethermonool of molecular weight 1,650 obtained using butanol/methanol as the starter in a weight ratio of 47:1, and the mixture is degassed as described above. 179 g of crude MDI having a viscosity of 100 cp are then added to the mixture at room temperature and the batch is briefly subjected to reduced pressure to remove gas bubbles and dissolved air. After adding 0.3 ml of dibutyl-tin dilaurate, the mixture is poured into preheated metal molds and cured for 2 hours at 100° C.

Brown, translucent sheets having the following mechanical properties are obtained:

tensile strength: 16 N/mm²;
elongation at break: 60%;
impact strength:
23° C.: does not fracture;
−40° C.: 42 KJ/m².

EXAMPLE 6

105 g of the polypropylene ether-triol described in Example 1 are mixed with 100 g of the polypropylene ether-monool described in Example 5 and 50 g of dipropylene glycol, and the mixture is degassed. 210 g of crude MDI having a viscosity of 100 cp are admixed at room temperature. The mixture is degassed under reduced pressure and after adding 0.3 ml of dibutyl-tin dilaurate is poured into preheated metal molds and cured for 1 hour at 100° C. Light brown sheets having the following properties are obtained:
tensile strength: 53 N/mm²;
elongation at break: 4.5%;
flexural strength: 82 N/mm²;
impact strength:
23° C.: 42 KJ/m²;
−40° C.: 46 KJ/m².

EXAMPLE 7

A prepolymer which has an NCO content of 41.8% is prepared from 520 g of toluylene diisocyanate having a 2,4/2,6 isomer ratio of 80/20 (TDI 80) and 26 g of the polypropylene ether-triol described in Example 1, by stirring for one hour at 100° C.

203 g of polypropylene ether-triol described in Example 1 and 105 g of the polypropylene ether-monool used in Example 5 are mixed and degassed, and 152.3 g of the prepolymer described above are admixed at room temperature. After briefly subjecting the mixture to reduced pressure, 0.3 ml of dibutyl-tin dilaurate is added and the mixture is poured into preheated metal molds and cured for 5 hours at 100° C.

Clear, colorless and transparent polyurethane sheets which have a bluish sheen and possess the following mechanical properties are obtained:
tensile strength: 22 N/mm²;
elongation at break: 16%
flexural strength: 46 N/mm²;
impact strength:
23° C: 58 KJ/m²;
−40° C.: 75 KJ/m².

EXAMPLE 8

100.2 g of the polypropylene ether-triol described in Example 1 are mixed with 50 g of dipropylene glycol and 50 g of the polypropylene ether-monool used in Example 5 and degassed, and 150 g of the polyisocyanate prepolymer described in Example 7 are admixed at room temperature. After briefly degassing the mixture, 0.3 ml of dibutyl-tin dilaurate is admixed, and a part of the mixture is poured into preheated metal molds and cured for 5 hours at 100° C.

The cured sheets are of ivory-like appearance and a thin layer exhibits a slight bluish sheen. The sheets have the following mechanical properties:
tensile strength: 54 N/mm²;
elongation at break: 3.5%;
flexural strength: 81 N/mm²;
impact strength:
23° C: 58 KJ/m²;
−40° C.: 37 k/m².

Another part of the mixture is poured into a beaker and left to stand at room temperature. The mixture cures within a few minutes, merely by virtue of its heat or reaction, to give a homogeneous body without cracks or warping.

EXAMPLE 9

180 g of a polyether obtained from 70% by weight of propylene oxide and 30% by weight of ethylene oxide, based on total weight, with glycerol as the starter, and having a molecular weight of 430, are mixed with 20 g of a monofunctional polyether of fairly high molecular weight, obtained from 67% by weight of propylene oxide and 33% by weight of ethylene oxide, based on total weight, with allyl alcohol as the starter, and having a molecular weight of 890, the mixture is degassed and 172.6 g of commercial crude MDI having a viscosity of 200 cp are admixed at room temperature. The mixture is stirred for some minutes longer under reduced pressure and is poured into preheated molds and cured for 5 hours at 110° C.

We claim:

1. A cured, hard, rigid, non-elastomeric, molded polyurethane composition which is obtained by reacting
   A. a liquid, hydroxylic polyether having a functionality of from 2 to 8 and an OH equivalent weight of from 50 to 250, or a mixture of such polyethers,
   B. a monofunctional, hydroxylic polyether having a molecular weight of from 150 to 10,000,
   C. a polyisocyanate and
   D. a catalyst, auxiliaries and additives wherein the ratios of the amounts of A, B and C are so chosen that the ratio of the NCO groups of C to the sum of the OH groups of A and B is from 0.9:1 to 1.2:1 and B is used in amounts of from 5 to 50% by weight, based on the total weight of A, B and C and the average functionality of the total reaction mixture is from 2 to about 3.

2. A process for the manufacture of a hard, rigid, non-elastomeric polyurethane composition in which
   A. a liquid, hydroxylic polyether having a functionality of from 2 to 8 and an OH equivalent weight of from 50 to 250, or a mixture of such polyethers,
   B. a monofunctional, hydroxylic polyether having a molecular weight of from 150 to 10,000,
   C. a polyisocyanate and
   D. a catalyst, auxiliaries and additives are mixed in such amounts of A, B and C that the ratio of the NCO groups of C to the sum of the OH groups of A and B is from 0.9:1 to 1.2:1, the amount of B is from 5 to 50% by weight, based on the total weight of A, B and C and the average functionality of the total reaction mixture is from 2 to about 3 and the reaction mixture is poured into molds and cured.

* * * * *